(12) United States Patent　　(10) Patent No.: US 8,296,500 B2
Furuichi et al.　　(45) Date of Patent: Oct. 23, 2012

(54) MEMORY SYSTEM AND COMPUTER SYSTEM

(75) Inventors: Tetsuo Furuichi, Osaka (JP); Takashi Oshikiri, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 312 days.

(21) Appl. No.: 12/029,825

(22) Filed: Feb. 12, 2008

(65) Prior Publication Data

US 2008/0244175 A1　Oct. 2, 2008

(30) Foreign Application Priority Data

Mar. 29, 2007　(JP) .................................. 2007-087545

(51) Int. Cl.
*G06F 12/00*　(2006.01)

(52) U.S. Cl. .......................... 711/103; 711/173; 709/211
(58) Field of Classification Search .................. 711/104, 711/173, 103; 709/211–212; 365/154; 463/44
See application file for complete search history.

(56) References Cited

U.S. PATENT DOCUMENTS

| 5,319,751 | A | * | 6/1994 | Garney | 711/115 |
| 5,737,582 | A | * | 4/1998 | Fukuzumi | 710/301 |
| 5,937,423 | A | * | 8/1999 | Robinson | 711/103 |
| 6,594,727 | B1 | * | 7/2003 | Tanaka | 711/115 |
| 6,687,835 | B1 | | 2/2004 | Hirano et al. | |
| 2004/0164170 | A1 | * | 8/2004 | Krygier et al. | 235/492 |
| 2006/0101136 | A1 | | 5/2006 | Akashika et al. | |

FOREIGN PATENT DOCUMENTS

| JP | H7-44672 | 2/1995 |
| JP | 2000-36015 | 2/2000 |
| JP | 2000-101568 | 4/2000 |
| JP | 2001-283170 | 10/2001 |
| JP | 2003-085509 | 3/2003 |
| JP | 2003-141481 | 5/2003 |
| JP | 2005-266952 | 9/2005 |
| JP | 2006-99509 | 4/2006 |
| JP | 2007-34581 | 2/2007 |

OTHER PUBLICATIONS

Japanese Office Action mailed on May 22, 2012 in counterpart Japanese application 2007-087545, filed on Mar. 29, 2007 with partial English translation.
Office Action issued Aug. 1, 2012, in Japanese Patent Application No. 2007-087545 with partial English Translation.

* cited by examiner

*Primary Examiner* — Matthew Bradley
(74) *Attorney, Agent, or Firm* — Oblon, Spivak, McClelland, Maier & Neustadt, L.L.P.

(57) ABSTRACT

When a memory card is inserted into a computer, a memory controller sends command information stored in a memory array to the computer. Then, the computer stores the command information received from the memory card into a RAM. The computer generates a command as needed on the basis of the stored command information and sends the generated command to the memory card. When the memory card receives the command from the computer, the memory controller analyzes the received command and performs it while making reference to command analysis information. This makes it possible to reduce a load accompanying the change and addition of commands in a semiconductor memory.

9 Claims, 6 Drawing Sheets

| REQUESTED OPERATIONS | COMMAND |
|---|---|
| READ | comA |
| DELETE | comB |
| WRITE | comC |

| COMMAND | ADDRESS |
|---|---|
| comA | addA |
| comB | addB |
| comC | addC |

910

F I G . 6

⋮

| | | |
|---|---|---|
| addA | mcodeA | 911 |
| addB | mcodeB | |
| addC | mcodeC | |

| REQUESTED OPERATIONS | COMMAND |
|---|---|
| READ | comA |
| WRITE | comC |
| TRANSITION | comD |

FIG. 8

| COMMAND | ADDRESS |
|---|---|
| comA | addA |
| comC | addC |
| comD | addB |

MEMORY SYSTEM AND COMPUTER SYSTEM

BACKGROUND OF THE INVENTION

1. Field of the Invention

The present invention relates to a technique to reduce a load accompanying the change of specifications of a semiconductor memory.

2. Description of the Background Art

In nonvolatile semiconductor memories in which game data and the like are stored, commands are inputted from external systems and various operations, such as reading of data from desired addresses, deletion of desired blocks, writing of data into desired pages or the like, are performed in response to the commands.

(Patent Document 1) Japanese Patent Application Laid Open Gazette No. 2001-283170.

Taking, e.g., game cassettes used for game devices as an example of semiconductor memories, commands encrypted in the system are generally used in order to prevent an illegal copy of game software. But if the encrypted commands are decoded, the specifications of the semiconductor memory have to be changed as soon as possible.

In the conventional semiconductor memories, however, combinations of the commands and operations are fixed to each of the semiconductor memories and if the commands are changed or added, redesign of the whole semiconductor memory is disadvantageously needed.

Further, if the specifications of the semiconductor memory is changed, the external system (e.g., a game device or the like) using it has to respond to the change, and this requires more costs. Furthermore, if the external system is a game device or the like, it is preferable that the specifications should not be changed for relatively long time in order to ensure compatibility.

SUMMARY OF THE INVENTION

The present invention is intended for a memory system connected to an external device.

According to the present invention, the memory system comprises a memory array for storing command information used to issue a command in the external device, a storage part for storing command analysis information used to analyze the command issued by the external device on the basis of the command information, a communication part for receiving the command issued by the external device on the basis of the command information, and a memory controller for analyzing the command received by the communication part on the basis of the command analysis information and performing the command.

By the memory system of present invention, it becomes possible to change and add commands only by rewriting the command information and the command analysis information without changing any hardware. Therefore, a development load of changing specifications of the memory system can be reduced.

Preferably, the storage part is provided in the memory array.

Since all the information needed to add or change commands (i.e., the command information and the command analysis information) are stored in the memory array, it is possible to respond to the change of specifications of the memory system only by rewriting data stored in the memory array.

Further preferably, the memory system further comprises a buffer for storing command analysis information which is stored in the storage part and transmitted therefrom, and in the memory system of the present invention, the memory controller analyzes the command on the basis of the command analysis information stored in the buffer.

Furthermore preferably, memory elements constituting the buffer are accessed by the memory controller faster than memory elements constituting the memory array.

By these aspects of the present invention, it is possible to increase the speed of command analysis operation.

The present invention is also intended for a computer system which comprises a computer and a memory system.

According to the present invention, in the computer system, the memory system comprises a memory array for storing command information used to issue a command in the computer, a storage part for storing command analysis information used to analyze the command issued by the computer on the basis of the command information, a communication part for receiving the command issued by the computer on the basis of the command information, and a memory controller for analyzing the command received by the communication part on the basis of the command analysis information and performing the command, and the computer generates a command which is needed, on the basis of the command information, and sends the command to the memory system.

It thereby becomes unnecessary to change the constitution of the computer even if the specifications of the memory system is changed. It is further unnecessary to change the hardware of the memory system. Therefore, a development load of changing specifications of the memory system can be reduced.

The present invention is further intended for a memory control method in a computer system which comprises a computer and a memory system.

It is therefore an object of the present invention to reduce a load accompanying the change and addition of commands in a semiconductor memory.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, the preferred embodiment of the present invention will be discussed in detail with reference to the accompanying drawings.

1. The First Preferred Embodiment

Figure 1:
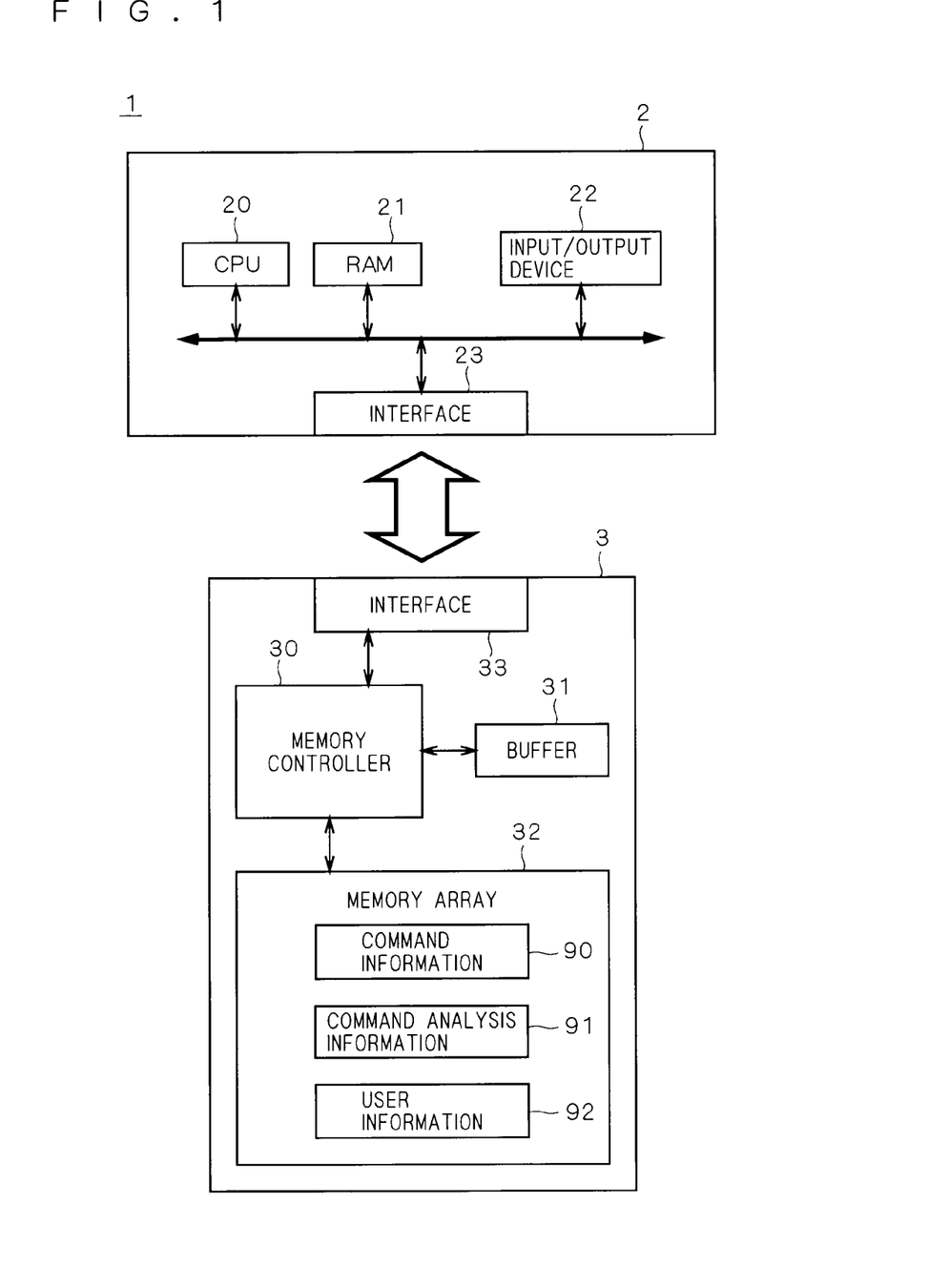
FIG. 1 is a view showing a constitution of a computer system in accordance with the present invention.

FIG. 1 is a view showing a constitution of a computer system 1 in accordance with the present invention.

The computer system 1 comprises a computer 2 and a memory card 3 to be inserted into the computer 2.

The computer 2 comprises a CPU 20 for performing computations of various data, a RAM 21 for storing various data therein, an input/output device 22 for users and an interface 23, and has a function as a general-type personal computer.

Though the computer 2 will be discussed as a general device in this preferred embodiment, the computer 2 may be a game device, a PDA, a cellular phone or the like which is used for a special purpose. In a case where the computer 2 is a game device, for example, the memory card 3 is a game cassette to be inserted into the game device and user information 92 is a game program to be loaded into the game device.

The CPU 20 performs computations or the like of various data while using the RAM 21 as a temporary work area and generates various control signals to control constituent elements of the computer 2.

The CPU 20 of this preferred embodiment acquires command information 90 from the memory card 3 through the interface 23 to store it into the RAM 21. The command information 90 which is stored in the memory array 32 is thereby transmitted from the memory array 32 to the RAM 21. The command information 90 does not always have to be transmitted to the computer 2 in advance.

The command information 90 is information needed in the computer 2 to issue commands to be given to the memory card 3. The command information 90 includes all the information which need to be updated when the specifications of the memory card 3 are changed.

The command information 90 of this preferred embodiment is information consisting of program codes to issue commands (hereinafter, referred to as "command issuing program") and parameters and the like which are used by the command issuing program.

Further, in order to start up the command issuing program, for example, at least an additional program for startup is needed in the computer 2 and this program code is also a kind of information required to issue a command in the computer 2. Since this program code, however, is information which does not need to be always changed when the specifications of the memory card 3 are changed, such information does not have to be included in the command information 90. Furthermore, if the command issuing program is designed to operate in common both before and after the change of specifications, for example, the command information 90 may be information only including parameters or the like.

The CPU 20 generates commands on the basis of the command information 90 stored in the RAM 21 and sends the generated commands to the memory card 3 as needed. In other words, the CPU 20 starts up the command issuing program and operates in accordance with this program to issue commands for the memory card 3.

The input/output device 22 includes various types of devices such as a display or an LED which displays various data for users, a printer which prints characters, images and the like, various types of buttons, a scanner, a mouse, a keyboard, a joystick, a controller or the like.

The computer 2 does not need to comprise all the above-mentioned devices and the input/output device 22 is not limited to these above-mentioned devices. The computer 2 has only to comprise necessary constituent elements as appropriate as the input/output device 22 in accordance with the use of the computer system 1 or the like.

The interface 23 has a function to carry out data communications with the memory card 3. The interface 23 comprises a card slot into which the memory card 3 is inserted. When the memory card 3 is inserted into the card slot, the computer 2 and the memory card 3 are electrically connected to each other to allow data communications therebetween.

The memory card 3 comprises a memory controller 30, a buffer 31, a memory array 32 and an interface 33 and mainly corresponds to the memory system of the present invention. The memory card 3 is used as a device to store user information 92 therein. The user information 92 is used mainly by the computer 2.

The memory controller 30 transmits command analysis information 91 stored in the memory array 32 to the buffer 31 in advance and analyzes a command received from the computer 2 through the interface 33 while making reference to the transmitted command analysis information 91. Then, the memory controller 30 performs this command in accordance with the analysis result.

The command analysis information 91 is information to analyze commands issued by the computer 2 on the basis of the command information 90. When the command information 90 is changed in response to the change of specifications of the memory card 3, the commands to be issued are thereby changed and therefore the command analysis information 91 which is information to analyze the commands has to be changed accordingly. In other words, the command information 90 and command analysis information 91 are paired information.

The memory controller 30 sends the command information 90 stored in the memory array 32 to the computer 2 through the interface 33. The command information 90 which is thus transmitted is stored into the RAM 21 of the computer 2 as discussed earlier.

The buffer 31 consists of nonvolatile memory elements and has a storage capacity large enough to store the command analysis information 91 therein. As discussed earlier, the command analysis information 91 is transmitted by the memory controller 30 to the buffer 31 and stored into it.

The memory elements constituting the buffer 31 can be accessed faster by the memory controller 30 than the memory elements constituting the memory array 32. Thus, by using the buffer 31 to be accessed faster than the memory array 32 as a memory device which the memory controller 30 refers to in the command analysis operation, it is possible to increase the speed of the command analysis operation performed by the memory controller 30.

The memory array 32 consists of a plurality of nonvolatile memory elements and stores the command information 90 and the command analysis information 91 as well as the user information 92 therein as shown in FIG. 1. The memory elements constituting the memory array 32 in this preferred embodiment can be used to not only read out data therefrom but also delete data therefrom or rewrite data therein. Though e.g., NAND elements can be adopted as such memory elements, the memory elements constituting the memory array 32 do not necessarily have to be erasable or rewritable but have only to store various data at least.

The interface 33 has a function to carry out data communications with the computer 2. The interface 33 are engaged with the interface 23 of the computer 2 to establish an electrical connection between the computer 2 and the memory card 3 and allow data communications therebetween.

The constitution and function of the computer system 1 of this preferred embodiment have been discussed above. Next, an operation of the computer system 1 will be discussed below.

Figure 2:
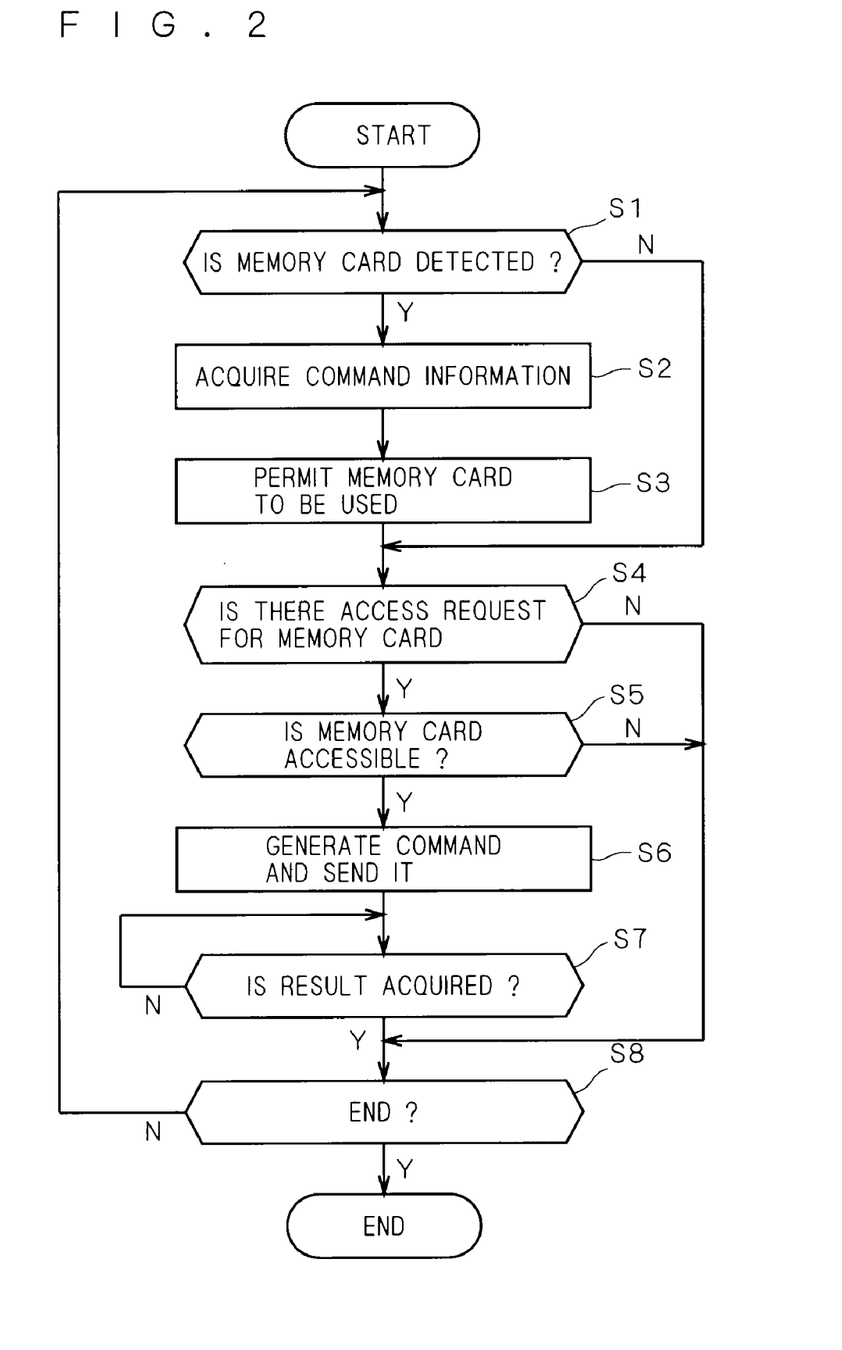
FIG. 2 is a flowchart showing an operation of a computer.

FIG. 2 is a flowchart showing an operation of the computer 2. The computer 2 makes predetermined initialization after switch-on and goes into a monitoring state. The computer 2 stores a state table indicating whether the memory card 3 can be used (is accessible) or not, and at the time when the initialization is made, the state table indicates that the memory card 3 can not be used.

In the monitoring state, the CPU 20 monitors whether the memory card 3 is detected or not (Step S1), whether an access request for the memory card 3 is issued or not (Step S4) and whether an end instruction is given or not (Step S8). In the monitoring state, however, the CPU 20 does not always have to wait and may perform any operation in parallel.

In the monitoring state, if the memory card 3 is detected, the CPU 20 judges "Yes" in Step S1 and acquires the command information 90 from the memory card 3 (Step S2).

Discussing in more detail, detection of the memory card 3 in Step S1 refers to whether the memory card 3 is detected or not in a state where the above-described state table indicates that the memory card 3 can not be used. In other words, the detection in Step S1 refers to initial detection of the memory card 3 and it does not mean detection of the memory card 3 which remains to be inserted. Specifically, if the memory card 3 has been already inserted in the computer 2 on switch-on, the judgment of Step S1 is "Yes" when the judgment is made for the first time. If the memory card 3 has not been inserted in the computer 2 on switch-on, the judgment of Step S1 becomes "Yes" only when the judgment is made for the first time after the memory card 3 is inserted into the interface 23.

Discussing specifically the operation of Step S2, first, the CPU 20 sends information requesting transmission of the command information 90 (hereinafter, this information will be referred to simply as "request") to the memory card 3 detected in Step S1. In response to the request, the command information 90 is transmitted from the memory card 3. Then, the CPU 20 receives the command information 90 transmitted from the memory card 3 through the interface 23 and stores the received command information 90 into the RAM 21.

The operation of Step S2 is not affected by the version of the memory card 3. Specifically, unupdated command information 90 is stored in the memory array 32 of the memory card 3 whose specifications are not changed, and in a state where the unupdated memory card 3 is inserted into the computer 2, the unupdated command information 90 is transmitted to the computer 2 and stored into the RAM 21. On the other hand, updated command information 90 is stored in the memory array 32 of the memory card 3 whose specifications are changed, and in a state where the updated memory card 3 is inserted into the computer 2, the updated command information 90 is transmitted to the computer 2 and stored into the RAM 21.

When the command information 90 is thus acquired, the CPU 20 permits the memory card 3 to be used (Step S3) and goes back into the monitoring state. The operation of Step S3 is performed by storing information indicating that the memory card 3 can be used (is accessible) into the above-described state table.

In the monitoring state, when the access request for the memory card 3 is issued, the CPU 20 judges "Yes" in Step S4 and checks if the memory card 3 can be used (Step S5).

If the Step S3 is not performed yet, the state table indicates that the memory card 3 can not be used since the state table remains to be the initial setting. Therefore, the CPU 20 judges "No" in Step S5 and Steps S6 and S7 are skipped.

On the other hand, if Step S3 is already performed and the state table is rewritten to allow the memory card 3 to be used, the CPU 20 judges "Yes" in Step S5. In this case, the CPU 20 generates a necessary command on the basis of the command information 90 stored in the RAM 21 and controls the interface 23 to send the generated command to the memory card 3. Thus, the computer 2 issues the command and sends it to the memory card 3 (Step S6).

Figure 3:
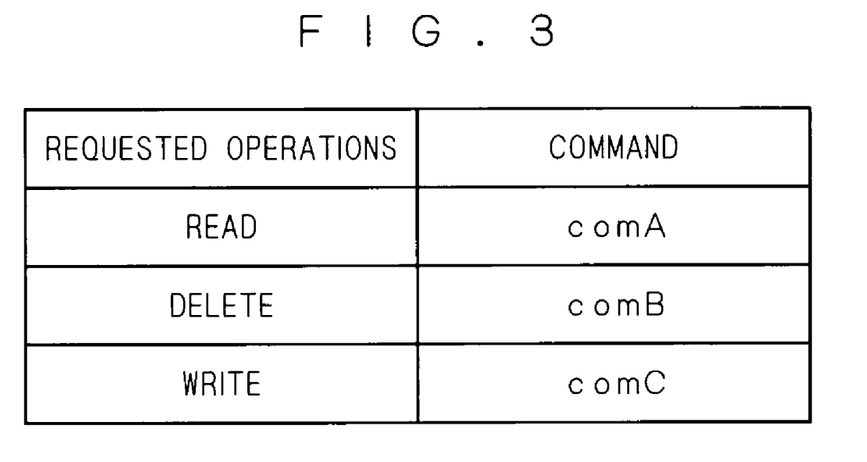
FIG. 3 is a table showing a correspondence between operations requested in the computer and commands issued correspondingly to the operations.

FIG. 3 is a table showing a correspondence between operations requested in the computer 2 and commands issued correspondingly to the operations. When Step S6 starts, the CPU 20 starts up the command issuing program included in the command information 90 and generates a command corresponding to an operation to be requested by computation on the basis of an identifier (not shown) indicating the requested operation.

If it is needed to read the user information 92 stored in the memory card 3 (i.e., to issue a read command), the CPU 20 generates a command corresponding to a read operation on the basis of the command information 90. In the exemplary case of FIG. 3, a command code corresponding to the read operation is "comA". Therefore, if it is needed to read the user information 92 out from the memory card 3, the CPU 20 generates the command "comA" on the basis of the command information 90 and sends the generated command to the memory card 3.

Thus, only by using the command information 90, it is possible for the computer 2 to generate a required command in accordance with the requested operation. Further, in the command sent from the computer 2 to the memory card 3, an address indicating the location of the memory array 32 to be accessed is included as needed. This address may be generated on the basis of the command information 90 or may be separately generated and added to the command.

After the command is sent, the CPU 20 waits until it acquires the result for the command from the memory card 3 (Step S7). Then, on acquiring the result, the computer 2 goes back into the monitoring state.

Since "comA" is a command for read operation as discussed above, the result to be acquired in the case where "comA" is sent as the command includes information indicating whether the read operation is normally performed or not and the user information 92 which is read out when the read operation is normally performed.

Thus, since the computer 2 receives the command information 90 sent from the memory card 3 and stores it therein in advance, the computer 2 (CPU 20) can generate any command for the memory card 3.

As discussed above, the command information 90 includes all the information which should be updated when the specifications of the memory card 3 are changed among the information which is required when the computer 2 issues the command.

Though detailed discussion will be made later, if the updated command information 90 is acquired in Step S2 (if the updated memory card 3 has been inserted), since the computer 2 issues the command on the basis of the updated command information 90, the issued command is a new command after the change of specifications. In other words, when the specifications of the memory card 3 are changed, it is not necessary to change the constitution (software and hardware) of the computer 2. Therefore, a load accompanying the change of specifications of the memory card 3 is reduced.

Further, if the unupdated command information 90 is acquired in Step S2 (if the unupdated memory card 3 has been inserted), since the computer 2 issues the command on the basis of the unupdated command information 90, the issued command is a command before the change of specifications. Therefore, since the unupdated memory card 3 can be used in the computer 2 even after a memory card 3 of new specifications is manufactured, it is possible to maintain compatibility.

If an end instruction is given in the monitoring state, the CPU 20 judges "Yes" in Step S8 and terminates all the operations.

The above is the operation which is performed mainly by the computer 2 in the computer system 1. Though omitted in the flowchart of FIG. 2, the computer 2 always monitors whether the memory card 3 is removed therefrom or not. Then, if the memory card 3 is removed, the CPU 20 writes information indicating that the memory card 3 can not be used into the state table.

Next, discussion will be made on an operation of the memory card 3.

Figure 4:
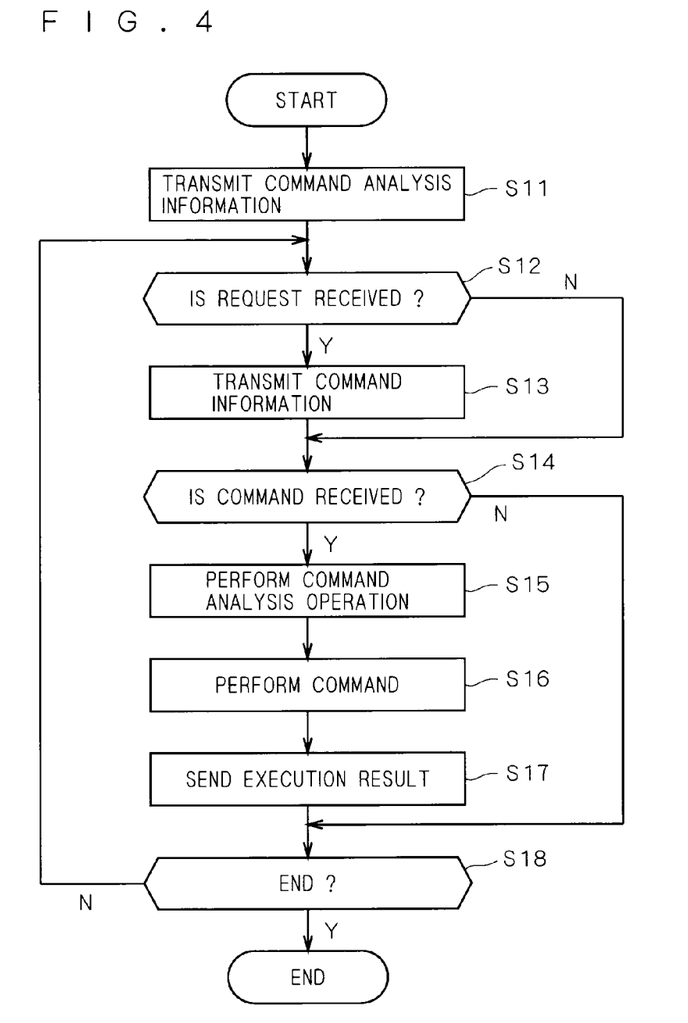
FIG. 4 is a flowchart showing an operation of a memory card.

FIG. 4 is a flowchart showing an operation of the memory card 3. After startup, the memory controller 30 of the memory card 3 first accesses the memory array 32, transmits the command analysis information 91 stored in the memory array 32 to the buffer 31 and stores it into the buffer 31 (Step S11). Then, after completing the transmission of the command analysis information 91, the memory controller 30 goes into the monitoring state.

In the monitoring state, the memory controller 30 monitors whether a request for transmission of the command information 90 is received from the computer 2 or not (Step S12), whether a command is received from the computer 2 or not (Step S14) and whether the end instruction is given or not (Step S18).

If the memory controller 30 receives the request from the computer 2 in the monitoring state, the memory controller 30 judges "Yes" in Step S12. Then, the memory controller 30 accesses the memory array 32 and controls the interface 33 to send the command information 90 stored in the memory array 32 to the computer 2. Thus, the memory card 3 sends the command information 90 to the computer 2 (Step S13).

Through execution of Step S13, the command information 90 which is sent to the computer 2 is acquired by the computer 2 as discussed above (in Step S2 of FIG. 2) and stored in the RAM 21. Further, after completing the transmission of the command information 90, the memory controller 30 goes back into the monitoring state.

If the memory controller 30 receives the command from the computer 2 in the monitoring state, the memory controller 30 judges "Yes" in the Step S14 and performs the command analysis operation (Step S15).

In the above Step S6, the exemplary case where the command "comA" is sent to the memory card 3 was discussed. Herein, the operation of Step S15 will be discussed in an exemplary case where "comA" which is sent in Step S6 is received.

When the command analysis operation is started, the memory controller 30 first accesses the buffer 31 and makes reference to the command analysis information 91.

Figure 5:
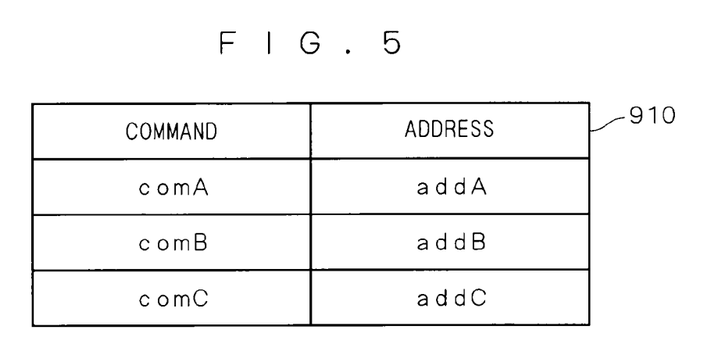
FIG. 5 shows an exemplary command table.
Figure 6:
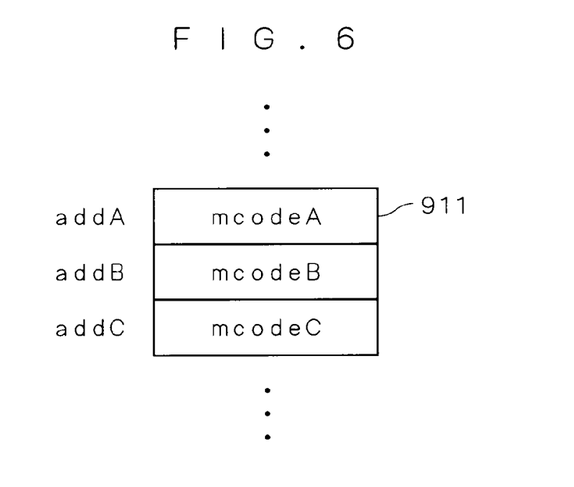
FIG. 6 is a view showing an example of command instruction information.

FIG. 5 shows an exemplary command table 910. FIG. 6 is a view showing an example of command instruction information 911. Though omitted in FIG. 1, the command analysis information 91 of this preferred embodiment includes the command table 910 of FIG. 5 and the command instruction information 911 of FIG. 6.

The command table 910 is information of table structure which links commands and addresses specifying respective instructions of the commands, and in each of areas specified by the addresses, microcodes of the corresponding command are stored. Further, the command instruction information 911 is information which exists in an area specified by a predetermined address and corresponds to a set of microcodes stored in this area. The microcode refers to a code required when a command sequencer (not shown) of the memory controller 30 performs the command.

A command judgment circuit (not shown) of the memory controller 30 searches the command table 910 with the received command "comA" to acquire the address "addA".

Next, the command sequencer of the memory controller 30 accesses an area specified by the address "addA" which is acquired by the command judgment circuit to acquire a microcode "mcodeA". The memory controller 30 (the command sequencer) can thereby analyze the received command on the basis of the microcode "mcodeA". In the exemplary case shown here, the received command "comA" is judged as a command to read data out from the memory array 32.

Though the above discussion has been made, for simplification, on the case where the analysis of the command is completed by making reference to the microcode only once, a command is analyzed generally by repeated references to the microcodes and computations. Thus, in the case where a plurality of computations are repeated, it is preferable to use any cryptographic algorithm. As the cryptographic algorithm, for example, the symmetric key cryptography using the command information 90 and the command analysis information 91 in a pair or the public key cryptography using these information in a pair may be used. Further, since the command information 90 is transmitted to the outside of the memory card 3 (i.e., the computer 2) in the computer system 1, it is preferable to use the public key cryptography.

After the command analysis operation is completed, the memory controller 30 performs the command (Step S16) and sends the execution result to the computer 2 (Step S17), and then goes back into the monitoring state.

In the exemplary case shown here, data (the user information 92) is read out from an area of the memory array 32 which is specified by the address included in the command "comA" and the user information 92 which is read out is sent to the computer 2. Thus, since the memory card 3 stores the command analysis information 91 therein, the memory card 3 can analyze and perform the command received from the computer 2.

The above is discussion on the operation of the computer system 1 of this preferred embodiment.

Next, discussion will be made on a case where the specifications of the memory card 3 are changed. Herein taken is a case, as an example, where in the specifications shown in FIGS. 3, 5 and 6, a delete operation (delete command) is removed, a read operation (read command) is changed and a transition operation (transition command) is added.

Figure 7:
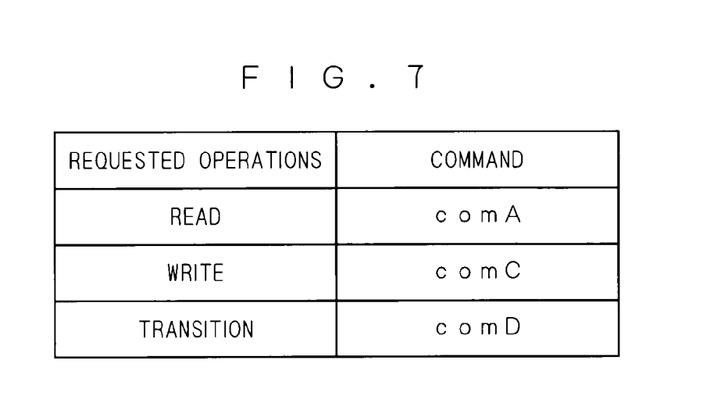
FIG. 7 is a table showing a changed correspondence between operations requested in the computer and commands issued correspondingly to the operations.

FIG. 7 is a table showing a changed correspondence between operations requested in the computer and commands issued correspondingly to the operations.

First, since no correspondence between the removed delete operation and its command is made in the updated command information 90, the command corresponding to the removed delete operation can not be generated. Therefore, there is no case where the computer 2 mistakenly generates the command which has been removed and sends the command to the updated memory card 3 which can not use the command.

Further, there is a correspondence between the command corresponding to the changed read operation and "comA" without any change in the updated command information 90. Therefore, for read operation, the computer 2 generates the command "comA" and sends it to the memory card 3 without consideration of the change.

Furthermore, there is a correspondence between the added transition operation and a new command "comD" in the updated command information 90. Therefore, for transition operation, the computer 2 generates the command "comD" like the other commands and sends it to the updated memory card 3.

As discussed earlier, in the computer system 1, the command information 90 is transmitted from the memory card 3 which is inserted in the computer 2 to the computer 2 and stored into the computer 2 regardless of before or after the update. Therefore, the computer 2 can generate the commands in accordance with the change of specifications of the memory card 3.

Further, since the computer 2 requests the command information 90 when the memory card 3 is inserted therein, if there is a normal correspondence between the memory card 3 and the command information 90 stored in the memory card 3, the computer 2 can operates normally. Therefore, since it is not necessary to change the specifications of the computer 2 even if the specifications of the memory card 3 are changed, it is possible to reduce the cost for the change of specifications.

As can be seen clearly from FIG. 3, there is no correspondence between the transition operation and the command "comD" in the command information 90 which is acquired from the unupdated memory card 3. Therefore, when the unupdated command information 90 is acquired, the computer 2 can not issue the unadded command "comD" and there is no case where the command "comD" is mistakenly sent to the unupdated memory card 3.

Further, as to the changed command (the command corresponding to the read operation in the above case), the command code before the change does not necessarily have to be issued without any change. For example, like the added command, a correspondence between the changed command and a new command code may be made.

Figure 8:
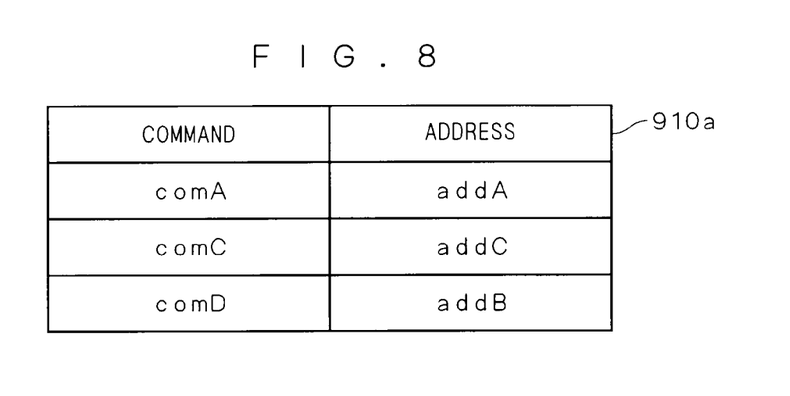
FIG. 8 shows an exemplary changed command table.
Figure 9:
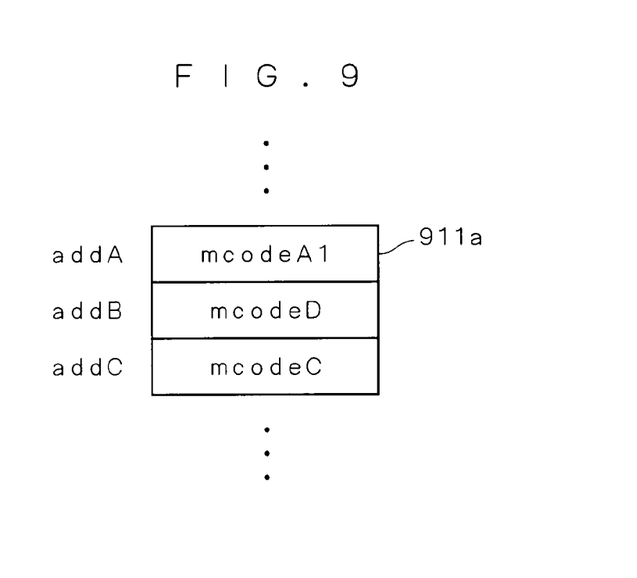
FIG. 9 is a view showing an example of changed command instruction information.

FIG. 8 shows an exemplary changed command table 910a. FIG. 9 is a view showing an example of changed command instruction information 911a.

First, the removed command "comB" does not exist in the command table 910a. As discussed above, since the computer 2 can not generate the command "comB" corresponding to the delete operation, there is no case where the memory card 3 receives the command "comB". But even if the memory card 3 receives the command "comB", there occurs no malfunction since the command "comB" is deleted from the command table 910a.

The command "comA" issued in accordance with the change read operation is registered in the command table 910a. Therefore, when the memory card 3 receives the command "comA", the memory controller 30 acquires the address "addA".

As shown in FIG. 6, the microcode in the area specified by the address "addA" in the command instruction information 911a is "mcodeA1", not "mcodeA" which is the code before the change of specifications. Therefore, the memory controller 30 performs a changed operation which is different from the operation before the change in response to the command "comA". Thus, on the changed command, the change is surely reflected.

Further, the command "comD" issued in accordance with the added transition operation is registered in the command table 910a. Therefore, when the memory card 3 receives the command "comD", the memory controller 30 acquires the address "addB". Then, the microcode in the area specified by the address "addB" in the command instruction information 911a is "mcodeD", not "mcodeB" which is the code before the change of specifications. Therefore, the memory controller 30 performs a changed operation (transition operation) in response to the command "comD". Thus, on the added command, the memory controller 30 performs a correct operation without any problem.

Thus, in the computer system 1 of this preferred embodiment, the command information 90 used to issue the commands in the computer 2 and the command analysis information 91 used to analyze the commands issued by the computer 2 on the basis of the command information 90 are stored, and the memory card 3 analyzes the commands issued by the computer 2 on the basis of the command information 90, on the basis of the command analysis information 91, and performs the analyzed commands. It thereby becomes possible to change, add and delete the commands only by rewriting the data (the command information 90 and the command analysis information 91). Therefore, it is possible to reduce a development load of changing specifications of the memory card 3 and the like since any change in the hardware is not needed.

Further, since all the information (the command information 90 and the command analysis information 91) required to add or change the commands are stored in the memory array 32, it is possible to respond to the change or addition of the commands only by rewriting the data stored in the memory array 32. In other words, it is possible to further reduce the load since it is not necessary to change the constitution of the computer 2.

Furthermore, the memory controller 30 transmits the command analysis information 91 stored in the memory array 32 in advance to the buffer 31 and carries out the analysis on the basis of the command analysis information 91 transmitted to the buffer 31. By using the memory elements to constitute the buffer 31, which can be accessed faster than those constituting the memory array 32, it is possible to increase the speed of the command analysis operation.

The area in which the command analysis information 91 is stored is not limited to the memory array 32 but other storage areas in the memory card 3 may be used therefor. Further, the area in which the command analysis information 91 is stored may be an area to which the computer 2 can not make reference. In other words, in the computer system 1, only the command information 90 and the command analysis information 91 in the memory card 3 have to be referred to.

Further, in this preferred embodiment, the command analysis information 91 includes the command table 910 and the memory card 3 stores the correspondence between commands and addresses therein. But if the addresses can be used as the commands, the memory card 3 does not need to store the command table 910 therein. If a read operation is needed in the computer 2, for example, "addA", not "comA", is generated as the command on the basis of the command information 90 and sent to the memory card 3.

2. Variations

Though the preferred embodiment of the present invention has been discussed above, the present invention is not limited to the above-discussed preferred embodiment, but allows various variations.

For example, the flowcharts of FIGS. 2 and 4 are examples and the operation of the computer system 1 is not limited to that shown in those flowcharts. In other words, if the same effect can be produced, the algorithm may be changed as appropriate. Though the computer 2 waits for the result for the sent command in Step S7 in the above discussion, for example, the computer 2 may go back into the monitoring state without waiting for the result as a matter of course. In that case, while performing another operation, the computer 2 may perform the operation in response to the result when the computer 2 receives the result.

Further, though the command instruction information 911 contains the microcode of the command in the above preferred embodiment, the command instruction information 911 may be a set of parameters, operators and control information on a group of circuits including a computing function. In other words, the command instruction information 911 has only to be information used to analyze the command inputted from the outside (the computer 2) and perform it and its contents are not limited.

Though the timing when the memory controller 30 transmits the command analysis information 91 to the buffer 31 (the timing to execute Step S11) is after startup of the memory card 3 in the above discussion, the timing may be, e.g., immediately after the memory controller 30 receives the first command from the computer 2. In other words, the memory controller 30 may transmit the command analysis information 91 until the memory controller 30 analyzes the first command.

While the invention has been shown and described in detail, the foregoing description is in all aspects illustrative and not restrictive. It is therefore understood that numerous modifications and variations can be devised without departing from the scope of the invention.

What is claimed is:

1. A memory system connected to an external device, comprising:
    a memory array configured to store command information, the external device generating a command based on the command information;
    a storage part configured to store command analysis information to analyze the command generated by said external device based on said command information;
    a communication part configured to receive the command generated by said external device based on said command information; and
    a memory controller configured
        to analyze said command received by said communication part based on said command analysis information, and
        to perform said command,
    wherein
        the external device requests the command information with respect to the memory system when detecting the memory system being inserted therein,
        the external device is forbidden access to said storage part, and
        the command information and command analysis information are paired information that are different from each other.

2. The memory system according to claim 1, wherein said storage part is included in said memory array.

3. The memory system according to claim 2, further comprising:
    a buffer configured to store the command analysis information transmitted from said storage part,
    wherein said memory controller analyzes said command based on the command analysis information stored in said buffer.

4. The memory system according to claim 3, wherein memory elements constituting said buffer are accessed by said memory controller faster than memory elements constituting said memory array.

5. A computer system comprising:
    a computer; and
    a memory system including
        a memory array configured to store command information, the computer generating a command based on the command information;
        a storage part configured to store command analysis information to analyze the command generated by said computer based on said command information;
        a communication part configured to receive the command generated by said computer based on said command information; and
        a memory controller configured
            to analyze said command received by said communication part based on said command analysis information, and
            to perform said command,
        wherein
            said computer requests the command information with respect to the memory system when detecting the memory system being inserted therein,
            said computer generates a required command based on said command information and sends the command to said memory system,
            the computer is forbidden access to said storage part, and
            the command information and command analysis information are paired information that are different from each other.

6. The computer system according to claim 5, wherein said storage part is included in said memory array.

7. The computer system according to claim 6, further comprising:
    a buffer configured to store command analysis information transmitted from said storage part,
    wherein said memory controller analyzes said command based on the command analysis information stored in said buffer.

8. The computer system according to claim 7, wherein memory elements constituting said buffer are accessed by said memory controller faster than memory elements constituting said memory array.

9. A memory control method in a computer system having a computer and a memory system, the method comprising:
    sending, from a memory array of said memory system, command information with respect to the memory system to said computer when detecting the memory system being inserted into the computer;
    generating a command in said computer based on said command information;
    sending said command from said computer to said memory system;
    analyzing said command based on command analysis information stored in a the storage part inside said memory system in advance; and
    performing said command in said memory system,
    wherein
        the computer is forbidden access to said storage part, and
        the command information and command analysis information are paired information that are different from each other.

* * * * *